Nov. 5, 1940.  A. E. LARSEN  2,220,109
AIRCRAFT SUSTAINING ROTOR
Filed Nov. 4, 1938  5 Sheets-Sheet 1

INVENTOR
Agnew E. Larsen
BY
Synnestvedt + Lechner
ATTORNEYS

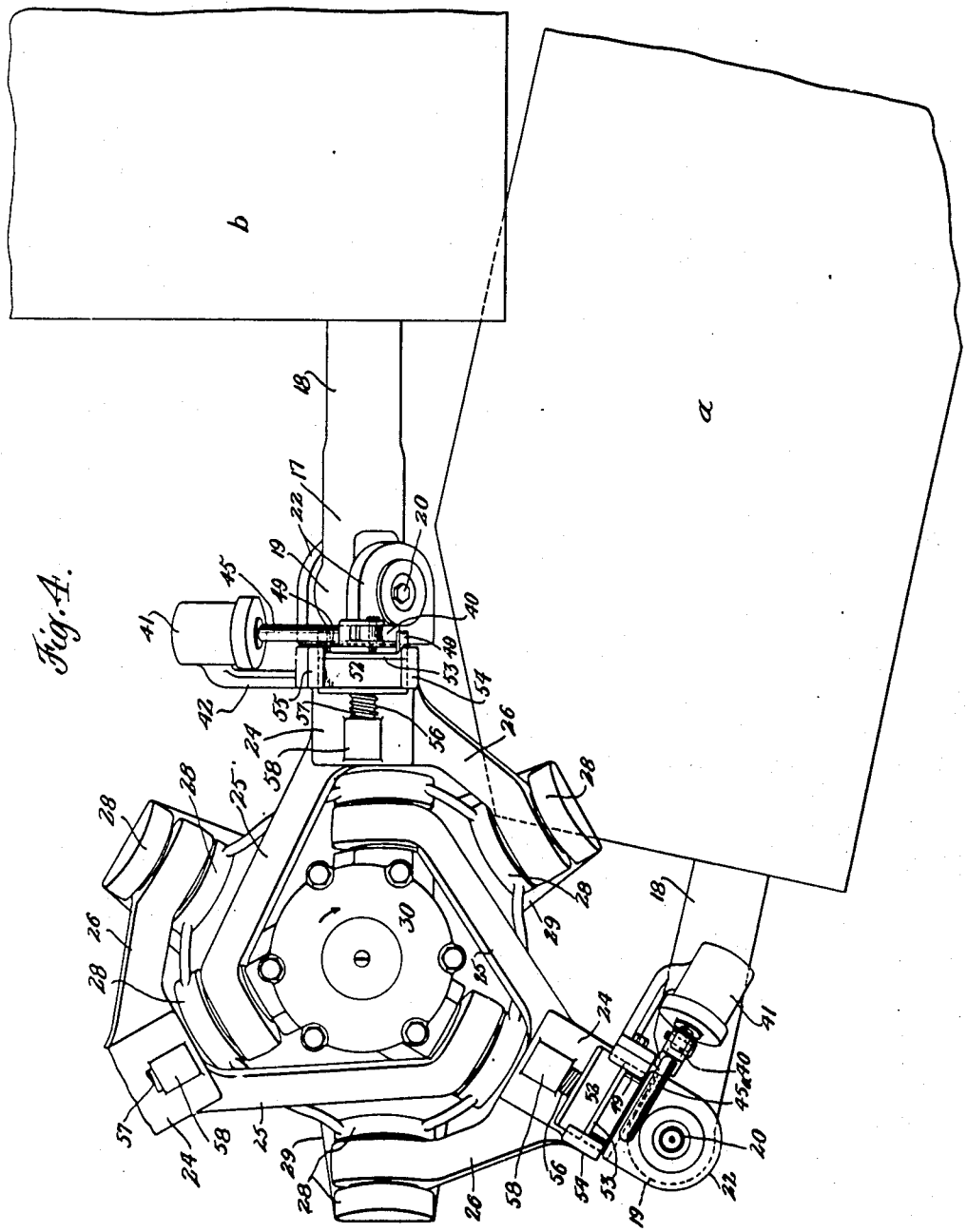

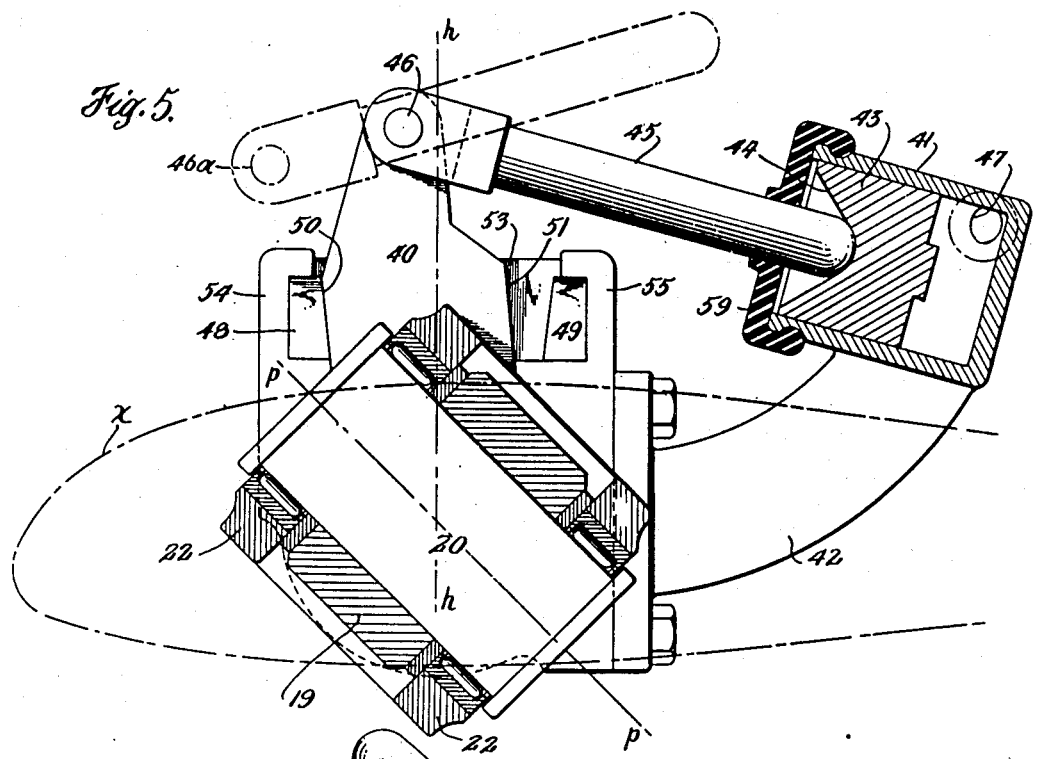
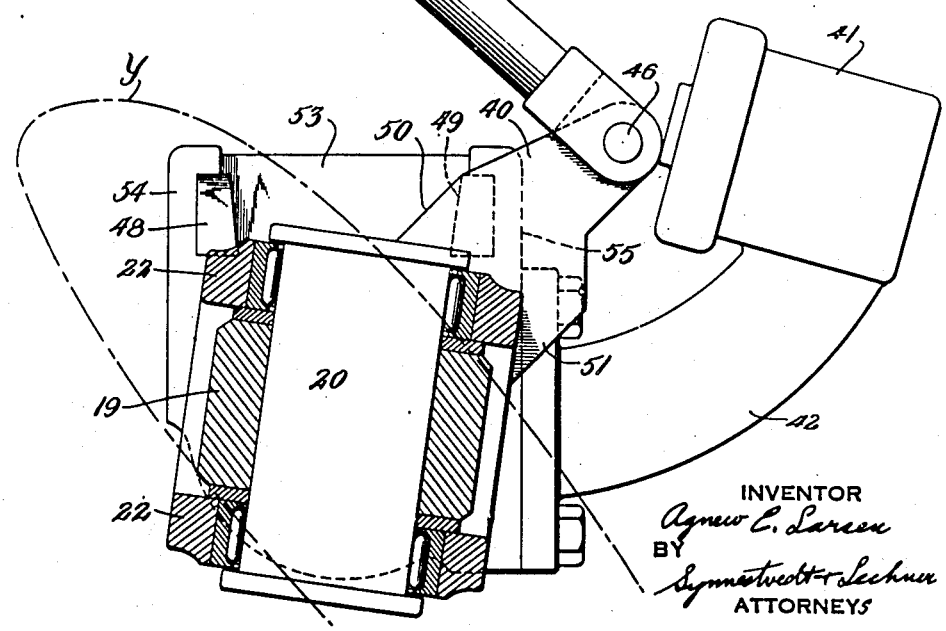

Nov. 5, 1940.  A. E. LARSEN  2,220,109
AIRCRAFT SUSTAINING ROTOR
Filed Nov. 4, 1938  5 Sheets-Sheet 5
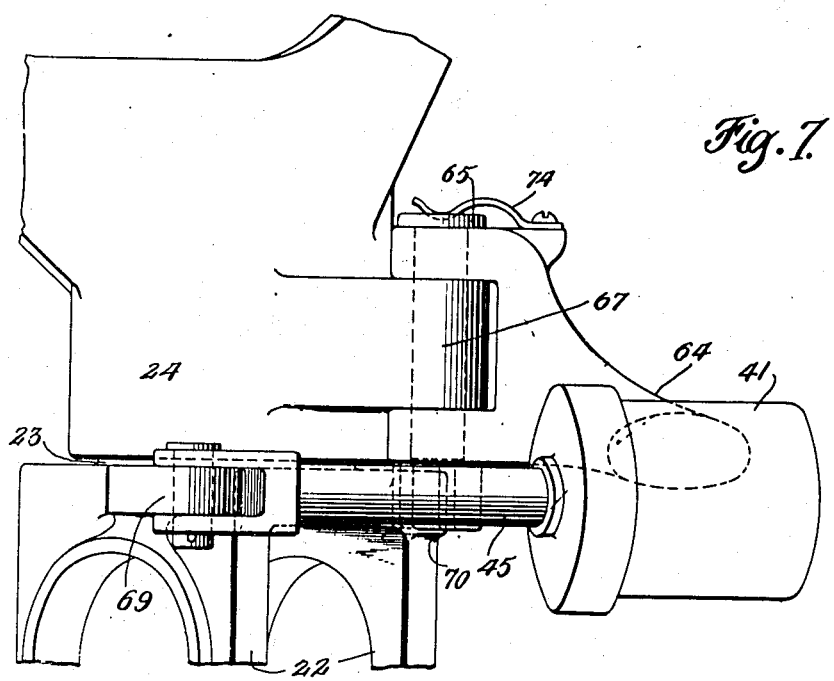
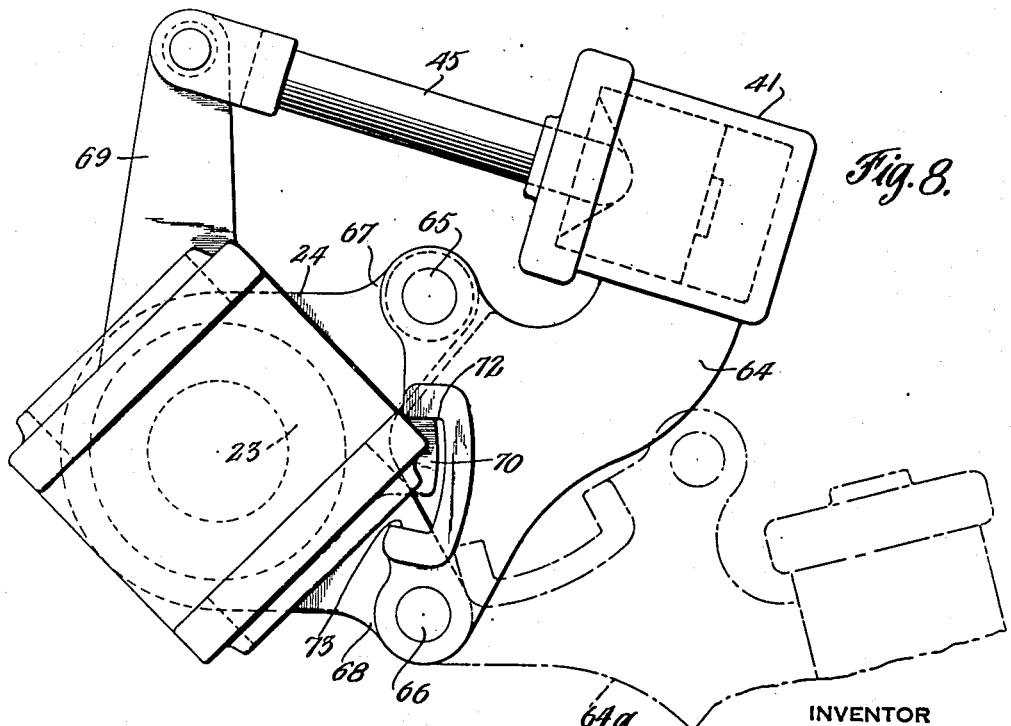
INVENTOR
Agnew E. Larsen
BY
Synnestvedt & Lechner
ATTORNEYS Patented Nov. 5, 1940

2,220,109

UNITED STATES PATENT OFFICE 2,220,109

AIRCRAFT SUSTAINING ROTOR

Agnew E. Larsen, Jenkintown, Pa., assignor, by mesne assignments, to Autogiro Company of America, a corporation of Delaware Application November 4, 1938, Serial No. 238,729

17 Claims. (Cl. 244—18)

This invention relates to aircraft sustaining rotors particularly of the type which are capable of autorotative actuation in flight. The invention is especially concerned with mounting mechanism for the blades of such rotors.

One of the principal objects of the invention is the provision of special pivot arrangements providing for folding of the rotor blades for purposes of road travel or storage of the machine.

In accordance with the invention, provision is made for folding by utilizing certain "flight" pivots by means of which the blades are mounted, notwithstanding the fact that such flight pivots normally have their axes positioned to provide for blade movement in a direction other than that utilizable for folding purposes.

In general, it may be stated that the foregoing is accomplished by the provision of means for shifting the axis of one of the flight pivots for each blade so as to bring the pivot axis into a position such that extreme angular movement of the blade thereabout may be employed for folding, for instance, folding of several blades to a position overlying the empennage of the machine.

Still further, the invention contemplates use of another one of the blade pivots as the instrumentality for shifting the axis of the pivot providing for folding. Thus blade folding is made possible while using only those pivot devices which are required for normal flight, even though the pivots are so angled in normal flight that blade movement thereon would occur in directions other than that which is practicable for folding purposes.

More specifically (though in its broad aspects the invention is not limited in this respect), I contemplate the utilization of a normally oblique flight pivot, such as an inclined drag pivot, for folding purposes, and obtain the necessary shifting of the angular position of said pivot by means of a blade pitch changing mounting, such as a worm thread mounting which is normally used to change the blade pitch at take-off.

The manner in which the foregoing objects and advantages are attained, together with others which are incident to the invention or which will occur to those skilled in the art, will be more fully brought out hereinafter following a description of the structural arrangements shown in the drawings, in which—

Figure 4 is a top plan view of portions of the hub and blade mounting mechanism shown in Figure 3, this view also illustrating portions of two of the blades in relatively folded relation;

Figures 5 and 6 are transverse sectional views through a portion of a blade mounting, indicating two different positions of various of the parts;

Figure 7 is a fragmentary top plan view of a modified form of the folding mechanism; and Figure 8 is an outer end elevational view of the arrangement of Figure 7.

Figure 1:
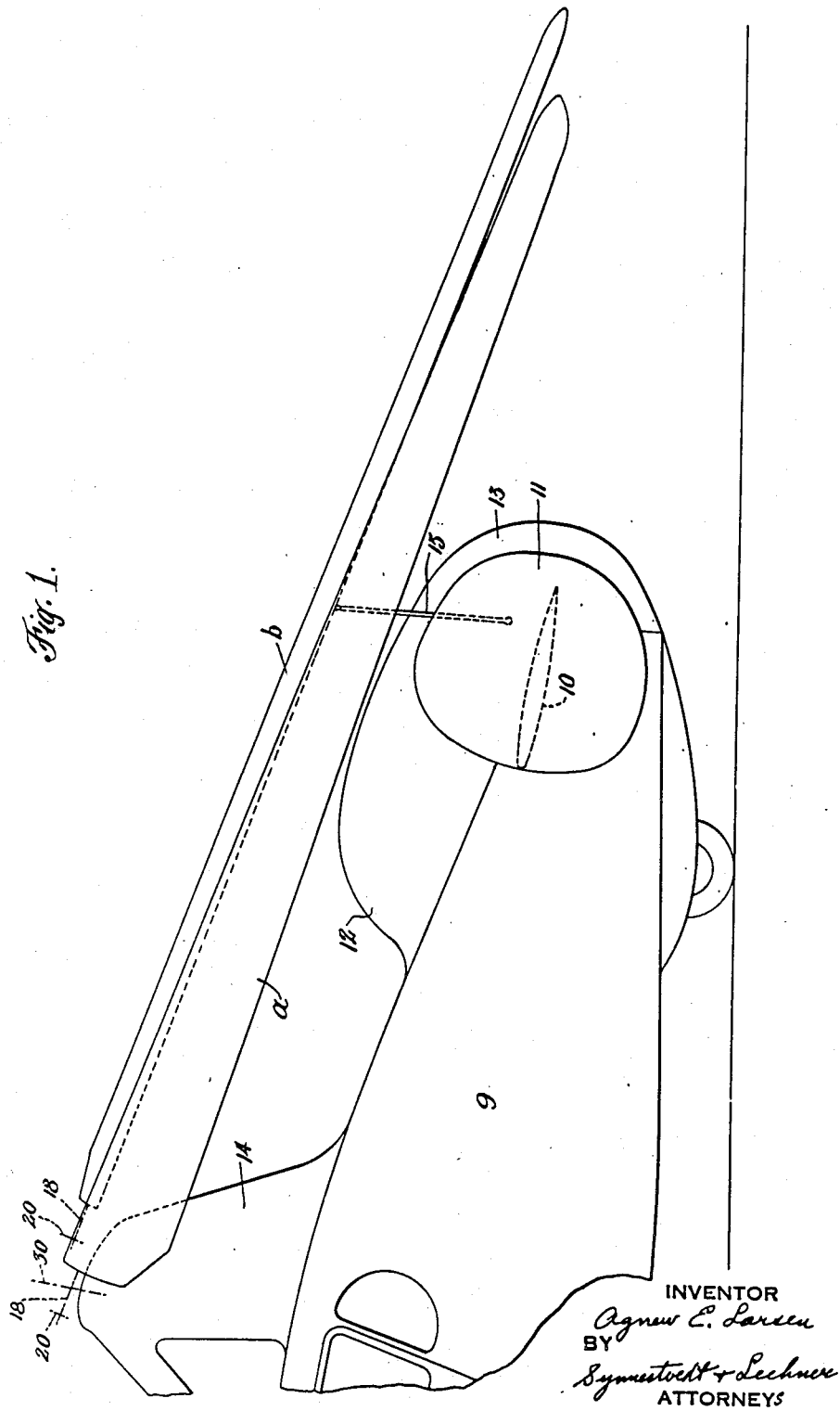
Figure 1 is a fragmentary side outline view of an aircraft of the character here involved, with the blades illustrated in folded position overlying the tail or empennage.
Figure 2:
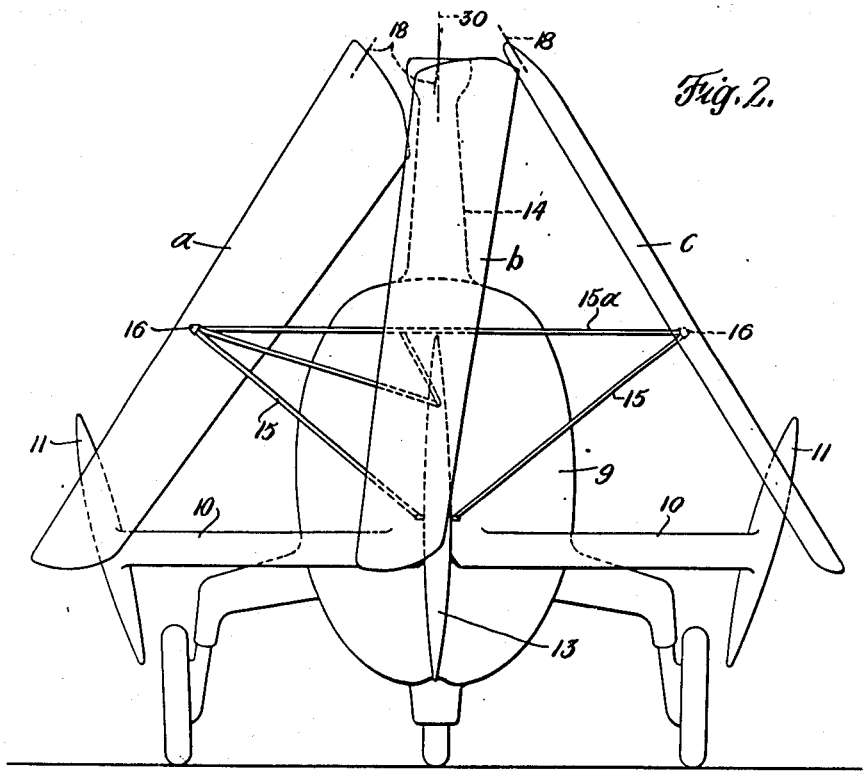
Figure 2 is a rear view of the machine with the blades folded as in Figure 1.

In Figures 1 and 2, the fuselage of the craft appears at 9, tail surfaces being provided thereon, including horizontal stabilizing surfaces 10—10 carrying dihedraled fins 11—11 at their outer ends. A vertical fin 12 is also employed and the rudder 13 is positioned in alignment therewith.

The rotor hub, which is not shown in Figures 1 and 2, is adapted to be mounted by means of a pylon 14 in a position generally above the center of gravity of the machine. The blades of the rotor, there being three in the embodiment illustrated, are shown at a, b and c in folded position over the tail surfaces. If desired, the blades when folded may rest directly on the tail surfaces, although I prefer to employ a light supporting frame such as indicated at 15, which frame may be made detachable and is preferably equipped with devices diagrammatically indicated at 16 for attachment to cooperating devices built into the blades.

When folding the three bladed rotor shown, the central blade (b in Figure 2) may merely rest on the horizontal bar 15a of the supporting framework.

Figure 3:
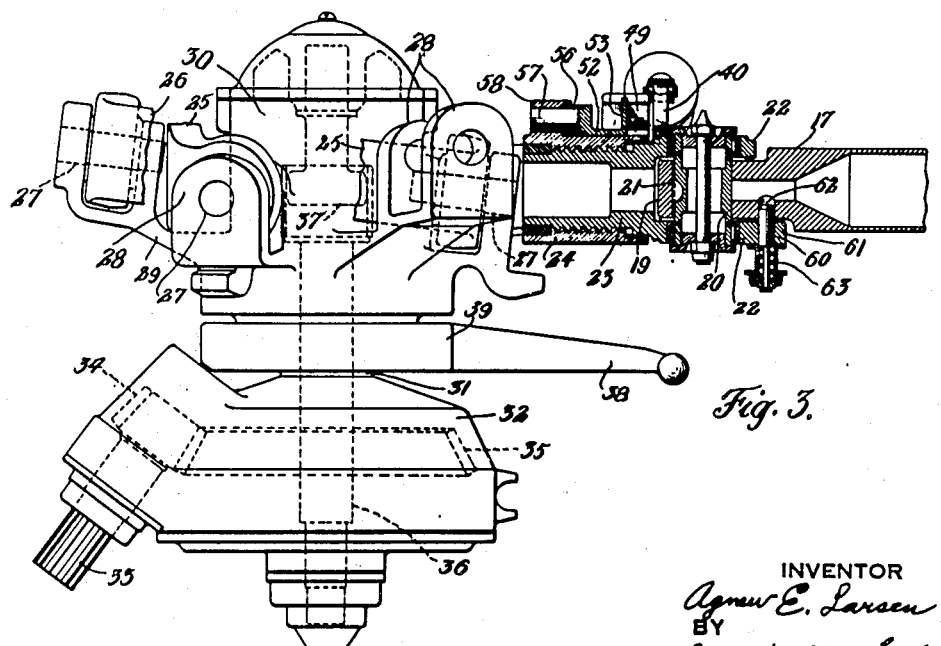
Figure 3 is a side elevational view, with certain parts broken away and others shown in section, of a rotor hub and the blade mounting mechanism associated therewith.

As shown in Figures 3 and 4, the root end fitting 17 for the spar 18 of each blade terminates at its inner end in a part 19 which is apertured to receive the pivot 20, this pivot preferably being keyed to the part 19 as is indicated at 21 in Figure 3. The part 19 is embraced by the prongs 22 of member 23, which prongs are also apertured to receive the projecting ends of the pivot 20, which ends are journalled therein.

For the purpose of providing aerodynamic damping of lag and lead movements of the blade in flight, as set out more fully in Bennett Patent No. 2,121,536 of June 21, 1938, the axis of pivot 20 is so positioned that when projected on the plane containing the hub axis and perpendicular to the longitudinal axis of the blade, the pivot axis forms an acute angle with the hub axis (desirably in the neighborhood of 45°, as shown by the pivot and hub axis lines $p—p$ and $h—h$ in Figure 5).

Furthermore, in the form illustrated, the axis of pivot 20 is inclined forwardly and upwardly with respect to the blade, although it is to be understood that similar effects may be obtained from the opposite inclination, and even when inclined in the opposite direction, the special mechanism providing for folding as described hereinafter may be adapted thereto.

While the axis of pivot 20 may also be inclined either toward or away from the axis of the hub (in which event movement of the blade about this pivot is accompanied by pitch change movement) I prefer to position the axis of pivot 20 in a plane perpendicular to the longitudinal axis of the blade and to employ other means (hereinafter described) to effect pitch change movement where that is desired.

Referring again to Figures 3 and 4, the prongs 22 which serve to mount the pivot 20 are formed as a part of the sleeve 23 lying within and in threaded engagement with the external sleeve 24, which latter (see Figure 4) is mounted on a blade fork having prongs 25—26 extended to embrace the hub. The threaded connection between sleeves 23 and 24 provides freedom for pitch change movement of the blade in the manner more fully described in copending application of James G. Ray, Serial No. 91,838, filed July 22, 1936. Certain portions of this mechanism will be mentioned more fully hereinafter.

The prongs 25 and 26 of each blade fork are apertured at their inner ends to receive pivots 27 mounted in pairs of apertured ears 28—28 which are carried on brackets 29 projecting from the rotative hub part 30.

As clearly seen in Figure 4, the prongs 25 and 26 of each blade fork are of different lengths, and, when viewed in plan, the axis of pivotation of the fork for each blade lies at an angle of approximately 60° from the longitudinal axis of the blade at the leading edge thereof, the normal direction of rotation of the rotor being indicated by an arrow on the hub in Figure 4. The axis of the "flapping" pivot for each blade fork, i. e., the pivot just referred to, is further inclined with respect to a plane perpendicular to the axis of the hub, the direction of inclination being upwardly toward the leading edge of the blade, as may be seen from the elevational view of Figure 3.

From Figure 4 it will also be seen that the several blade forks interfit around the hub, this general arrangement of interfitting forks with "flapping" pivot axes obliquely inclined in plan being disclosed and claimed in my copending application Serial No. 271,841, filed May 5, 1939.

The rotative hub part 30 is mounted on suitable bearings, not shown, on a non-rotative spindle 31 projecting upwardly from the supporting housing 32. The rotor may be driven by means of shaft 33 adapted to be coupled to the power plant for operating the propulsive air screw (not shown) for the craft. The drive is connected from shaft 33 through pinion 34 to ring gear 35, which is mounted on the central shaft 36 extended upwardly through the non-rotative hub part 31 and connected at its upper end to the rotative hub part 30, a universal joint 37 being interposed in this shaft, as described and claimed in my copending application above referred to.

Preferably, and as disclosed in said copending application the rotative hub part 30 is adapted to be tilted in all directions as by means of control connections, one of which appears at 38, coupled with a non-rotative ring 39 between which and the rotative hub part 30 a suitable bearing may be provided, various of these parts not being illustrated or described in detail herein, since they form no part of the present invention per se.

In considering further features of the blade mounting mechanism and operation thereof, reference should be made to Figures 3 to 6 inclusive. Here it will be seen that an arm 40 projects upwardly from the sleeve 23 which carries the apertured ears 22 cooperating with the pivot 20, the arm 40 serving as one of the reaction points for a mechanism for effecting relative rotation of the sleeve 23 and 24 and thus pitch change movement of the blade. The device for effecting this movement includes a cylinder 41 mounted by means of bracket 42 on the external sleeve 24. Piston 43 working in cylinder 41 has a socket 44 therein adapted to receive rod 45 which is pivotally connected at 46 with the free end of arm 40. Operating pressure may be introduced into and exhausted from the cylinder 41 by means of connection 47 and, as clearly appears in Figure 5, admission of pressure will result in relative movement of sleeves 23 and 24, the various parts being so arranged with relation to the blade, shown in dot and dash outline in Figure 5 at $x$, that admission of pressure into the cylinder causes the blade to assume a reduced pitch position, preferably approximating zero lift, in accordance with the copending application of James G. Ray above referred to. Furthermore, in accordance with said copending application, the worm thread between sleeves 23 and 24 is so oriented that the action of centrifugal force on the blade tends to move the blade from zero pitch position to a positive value, i. e., from the position where surface 50 abuts stop 48 to a position where surface 51 abuts stop 49 (see Figure 5).

In the operation of this portion of the mechanism, prior to take-off from the ground, fluid pressure is admitted to the cylinders 41 so as to reduce the pitch of the several blades. The rotor is then driven, as by means of the drive mechanism referred to above, and preferably the rotational speed is increased to a value substantially above the normal autorotational rate. When the high speed is attained, a suitable clutch in the rotor drive is disconnected and fluid pressure is released in cylinder 41, with the result that centrifugal force acting on the worm thread between parts 23 and 24 moves the blade to the increased pitch position. The rotor is now turning free and the kinetic energy stored therein, with the blades at a positive lift incidence, develops a high lift and effects "direct" or substantially vertical take-off. The propulsive air screw of the machine is driven during the take-off and the machine proceeds in translational flight, the airflow across the blades at this time serving to keep the rotor in motion substantially at the autorotational rate aforesaid.

It should be understood that the mechanism for effecting the said direct take-off is not per se my invention, but I have coordinated or combined it with other parts to accomplish a new function. Nevertheless, in its broader aspects, the invention is not limited to a machine having direct take-off mechanism.

As above noted, the range of pitch change movement permitted for purposes such as those already described is defined by stop means including elements 48 and 49 normally positioned to cooperate with stop faces 50 and 51 formed on arm 40. The stop or abutment parts 48 and 49 project from a device 52, being connected therewith by means of web 53, the device 52 being slidably mounted between guideways 54 and 55. Normally, the stop elements 48 and 49 are advanced outwardly to embrace the arm 40 by the action of centrifugal force on the device 52 and also by means of spring 56 surrounding plunger 57 which is guided in a sleeve 58. The guides 54 and 55 and sleeve 58 are all formed on the outer sleeve 24 of the threaded pitch change mounting device.

The stops 48 and 49 may be withdrawn against the pressure of spring 56 (to the position shown in Figure 3 and for blade a in Figure 4), and when so withdrawn, the pitch change movement of the blade is no longer limited and, in consequence, the arm 40 may be rotated with sleeve 23 in a counterclockwise direction, when viewed as in Figure 5, until the pivot 46 for rod 45 takes the position indicated at 46a, in which position the rod 45 is withdrawn from the cylinder 41. An apertured rubber cap 59 is desirably employed over the open end of cylinder 41, the rod 45 projecting therethrough when the parts are in their normal operative position.

After withdrawal of rod 45, this rod is preferably swung upwardly and away from the cylinder substantially to the position indicated at 45a in Figure 6, and the arm 40, together with the sleeve 23, is rotated in a clockwise direction, in consequence of which the pivot 20 is shifted in position as clearly appears in Figure 6, and the blade assumes a position indicated by the dot and dash outline y.

With the axis of pivot 20 extended in an upright direction, the blade may now be moved on this pivot in either direction approximately in the mean rotative path of travel of the blades. Prior to effecting this blade movement, however, it is necessary (see Figure 3) to withdraw the plunger 60 which is mounted on an extension 61 of the lower prong 22. This plunger 60 normally projects into an arcuate slot 62 formed in the blade root fitting 17 and permits limited movement of the blade about the axis of pivot 20 during flight operation, as shown in my copending application Serial No. 106,343, filed October 19, 1936, and issued April 25, 1939 as Patent No. 2,155,427. For folding purposes, however, the angular displacement of the blade must be much greater than that permissible in flight, and the release of plunger 60 permits this large folding movement of the blade. Plunger 60 is normally urged into engagement with slot 62 by a spring 63.

Attention is now called to the fact that the sectional showing of the blade root and associated parts at the right of Figure 3 is taken with the parts moved approximately to the position appearing in Figure 6 and at the root of blade a in Figure 4.

When it is desired to employ the foregoing mechanism for folding the blades, one of the three blades of the motor (for instance blade b) is preferably positioned generally centrally over the tail structure, as seen in Figure 2, and then the other two blades are each folded rearwardly so as to occupy positions as indicated at a and c in Figure 2. Note also that in Figures 1 and 4, the blade a at the left-hand side of the craft is shown in rearwardly folded position.

In view of the angularity (when viewed in plan) of the flapping hinge for each blade with respect to the longitudinal axis thereof, when the left-hand blade (a—see Figures 1 and 4) is folded, the flapping axis generally parallels the longitudinal axis of the blade, and because of this, it is possible to pivot the blade somewhat about the flapping axis by moving the trailing edge upwardly and downwardly in order to bring the trailing edge of this blade into the most compact position. In fact, the various pivots for the blades and the provision of means for shifting the inclination of pivot 20 even provide for some overlapping as between the blades and as between a blade and certain parts of the hub, as is illustrated in Figure 4.

When in folded position, as mentioned above in connection with Figures 1 and 2, the blades may be supported by framing 15 and, if desired, may be attached thereto at points 16.

In analyzing the foregoing mechanism, it will be noted that provision is made for the use of a "drag" pivot (20) which is inclined with respect to the vertical, so as to obtain aerodynamic damping of lag and lead movements of the blade in flight, while at the same time making possible the employment of this pivot for folding purposes by shifting the position of its axis. It is of especial advantage also that the mechanism employed for shifting the axis of pivot 20 constitutes another pivot device employed for other purposes, such as pitch change of the blade for direct take-off. Thus no extra pivots need be provided specially for folding.

In the modified arrangement of Figures 7 and 8, the pitch change cylinder 41 is mounted by means of bracket 64 which is pinned at points 65 and 66 to lugs 67 and 68 formed on the outer member 24 of the threaded pitch change mounting. In this form an operating arm 69 projects upwardly from the inner member 23 of the threaded pitch change mounting, the arm again being connected with the displaceable piston rod 45. Movement of the blade in the pitch change sense is limited by means of a tongue 70 projecting from the inner member 23 and cooperating with stop faces 72 and 73 formed on the bracket 64 for mounting cylinder 41.

As will be seen from Figure 7, the pin 65 at the upper side of the bracket 64 may be drawn out after displacement of retainer spring 74, and then the entire bracket with cylinder 41 may be pivoted downwardly about the axis of the pin 66 to the position indicated in dot and dash outline at 64a. In this position the stop faces 72 and 73 are clear of the path of movement of the tongue 70, so that the two parts of the pitch change mounting may be rotated beyond the limits normally imposed and thereby the axis of pivot 20 may be shifted to the position desired for folding.

The mechanism of Figures 7 and 8 is of particular advantage since withdrawing the pin 65 and swinging the cylinder bracket downwardly not only disconnects the device for effecting pitch change, but at the same time separates the limiting stops. This arrangement is also of advantage in many instances because of the fact that for folding purposes the cylinder supporting bracket is moved downwardly to such extent that it will clear blade root parts of adjacent blades when folded.

Actual folding with the arrangement of Figures 7 and 8 takes place in the same way as that described above in connection with the first form considered.

The geometrical disposition of pivots 27, 23 and 20 (as best seen in Figures 3 and 4), and their interaction in flight operations, are claimed in my copending application Serial No. 359,677, filed October 4, 1940.

What I claim is:

1. In an aircraft having a bladed sustaining rotor, blade mounting mechanism including a hub and two pivot devices connecting the blade with the hub, one of said pivot devices having its axis normally lying at an oblique angle to the horizontal in a plane generally transverse the longitudinal axis of the blade, the second pivot device being effectively interposed between the hub and the first pivot device and having its axis positioned to provide freedom for movement of the blade substantially about its longitudinal axis, stop means normally restricting movement of the blade about the second pivot axis, said stop means being releasable to provide for movement of the blade together with the first pivot device to a position in which the axis of said first pivot device extends in a generally upright direction, whereby the blade may be moved about the axis of the first pivot device to an extreme angular position for folding purposes.

2. In an aircraft having a bladed sustaining rotor, blade mounting mechanism including a hub and two pivot devices connecting the blade with the hub, one of said pivot devices having its axis normally lying at an oblique angle to the horizontal in a plane generally transverse the longitudinal axis of the blade, releasable stop means for restricting movement of the blade about the axis of this first pivot device during normal flight operation, the second pivot device being effectively interposed between the hub and the first pivot device and having its axis positioned to provide freedom for movement of the blade substantially about its longitudinal axis, stop means normally restricting movement of the blade about the second pivot axis, said stop means being releasable to provide for movement of the blade together with the first pivot device to a position in which the axis of said first pivot device extends in a generally upright direction, whereby upon release of the stop means for the first pivot, the blade may be moved about the axis thereof to an extreme angular position for folding purposes.

3. In an aircraft having a bladed sustaining rotor, blade mounting mechanism including a hub and two pivot devices connecting the blade with the hub, one of said pivot devices having its axis positioned to provide freedom from movement of the blade in a direction transverse the mean rotative path of travel thereof, the second pivot device being effectively interposed between the hub and the first pivot device and having its axis positioned to provide freedom for movement of the blade substantially about its longitudinal axis, stop means normally restricting movement of the blade about the second pivot device, said stop means being releasable to provide for movement of the blade together with the first pivot device to a position in which the axis of said first pivot device extends in a generally upright direction, whereby the blade may be moved about the axis of the first pivot device to an extreme angular position for folding purposes.

4. Blade mounting mechanism for an aircraft sustaining rotor including at least a pair of pivot devices each providing freedom for movement of the blade during operation of the aircraft, the axes of said pivot devices being normally so located as to provide freedom for blade movement in directions other than substantially fore and aft in the mean rotative path of travel of the blade, and stop means associated with one of said pivot devices for restricting blade movement about the axis thereof, said stop means being releasable to permit movement of the blade beyond the limits defined thereby and to provide for shifting of the axis of the other of said pivot devices to such position as to permit extreme angular movement of the blade substantially in the plane of rotation thereof.

5. For an aircraft sustaining rotor having a hub and a blade, a pivot device connecting the blade with the hub and providing freedom for automatic flight movements of the blade in a direction transverse a plane perpendicular to the axis of rotation, and means operative without disconnecting the blade from the hub, said means providing for shifting of the axis of said pivot device out of the flight position to a location in which the blade may be folded to an extreme angular position generally in said plane, for folding purposes.

6. For an aircraft sustaining rotor having a hub and a blade, a pivot device connecting the blade with the hub and providing freedom for automatic flight movements of the blade in a direction transverse a plane perpendicular to the axis of rotation, and means operative without disconnecting the blade from the hub, said means providing for shifting of the axis of said pivot device out of the flight position to a location in which the blade may be folded to an extreme angular position generally in said plane, for folding purposes, said mean comprising a second pivot device the axis of which is substantially coincident with the longitudinal axis of the blade.

7. For an aircraft having a sustaining rotor comprising a generally upright hub and a plurality of blades, blade mounting mechanism including a pivot device providing freedom for blade swinging in a direction at an angle to a plane perpendicular to the axis of the hub, a second pivot device effectively interposed between the first pivot device and the hub and providing freedom for blade movement substantially about its longitudinal axis for pitch change purposes, mechanism for controlling the position of the blade about the axis of the pitch change pivot, stop means associated with the pitch change pivot for limiting pitch change movement of the blade, the stop means being displaceably mounted whereby to permit movement thereof out of effective position so as to provide for pitch change movement of the blade beyond the limits normally provided by the stop means, whereby to provide for shifting of the axis of the first pivot device to a position in which it extends generally perpendicular to the plane of rotation and thereby to permit extreme angular displacement of the blade about the axis of the first pivot in a direction substantially within the plane of rotation for folding purposes.

8. For an aircraft having a sustaining rotor comprising a generally upright hub and a plurality of blades, blade mounting mechanism including a pivot device providing freedom for blade swinging in a direction at an angle to a plane perpendicular to the axis of the hub, a second pivot device effectively interposed between the first pivot device and the hub and providing freedom for blade movement substantially about its longitudinal axis for pitch change purposes, mechanism for controlling the position of the blade about the axis of the pitch change pivot, stop means associated with the pitch change pivot for limiting pitch change movement of the blade, the stop means being displaceably mounted whereby to permit movement thereof out of effective position so as to provide for pitch change movement of the blade beyond the limits normally provided by the stop means, whereby to provide for shifting of the axis of the first pivot device to a position in which it extends generally perpendicular to the plane of rotation and thereby to permit extreme angular displacement of the blade about the axis of the first pivot in a direction substantially within the plane of rotation for folding purposes, and yieldable means normally urging the stop means toward effective position in which pitch change movement of the blade is limited.

9. In an aircraft having a sustaining rotor incorporating a hub and a blade, mechanism for mounting the blade on the hub including a flapping pivot, the axis of which, when viewed in plan, makes an acute angle with the longitudinal blade axis, a drag pivot, the axis of which when projected on the plane perpendicular to the blade axis and containing the hub axis makes an acute angle with the hub axis, an interposed pitch change pivot providing freedom for pitch change movement of the blade and for shifting of the position of the drag pivot axis and thereby permit positioning of the drag pivot axis so that the blade may be folded thereabout substantially within a plane perpendicular to the hub axis, controllable means for changing the pitch of the blade on the pitch pivot during operation of the craft, and releasable means normally restricting pitch change movement of the blade to a range insufficient to permit said folding.

10. For an aircraft sustaining rotor having a hub and a blade, pivot means connecting the blade with the hub including a drag pivot the axis of which is obliquely inclined with respect to a plane perpendicular to the hub axis, a pitch change pivot interposed between the drag pivot and the hub and comprising a pair of relatively telescoped members rotatable substantially about the longitudinal blade axis, pitch change means associated with said members, and cooperating stop devices on said two members normally limiting pitch change movement, at least one of the stop devices being displaceable out of the path of the other to provide freedom for greater relative angular movement of said members and thereby provide for shifting of the axis of the drag pivot to a position in which the blade may be folded to an extreme angular position about the axis of the drag pivot generally within a plane perpendicular to the hub axis.

11. In an aircraft having a bladed sustaining rotor incorporating a hub and a blade, a blade pivot providing freedom for blade swinging in a direction transverse the mean rotative path of travel, a pitch change pivot effectively interposed between the first pivot and the hub and thereby providing for shifting of the position of the axis of the first pivot, stop means for restricting movement of the blade about the pitch change pivot, the stop means being displaceable to permit shifting of the axis of the first pivot for blade folding purposes, the path of movement of the displaceable stop means being such that the action of centrifugal force tends to move the stop means toward effective position.

12. In an aircraft having a sustaining rotor incorporating a hub and a blade, a plurality of pivot devices serially interconnecting the blade and the hub and providing freedom for movement of the blade in different senses during normal operations of the aircraft, means normally restricting blade movement about a radially inner one of said pivot devices, said means being releasable to provide for shifting of the position of the axis of an outer one of said pivot devices, the provided positions of shifting including one in which the blade may be folded to an extreme angular position about the axis of said outer pivot device.

13. For a bladed aircraft sustaining rotor, a blade mounting mechanism including a pivot the axis of which when projected on a plane perpendicular to the longitudinal blade axis and containing the axis of the hub of the rotor makes an acute angle with the hub axis, a pitch varying mounting for the blade located inboard of said pivot and including members relatively rotatable substantially about the longitudinal axis of the blade, a device for controlling the blade pitch angle associated with said members and adapted to react therebetween, said device being disconnectible upon relative rotation of said members to a point beyond the normal operative range, and releasable stop means limiting relative rotation of said members beyond the normal range.

14. For a bladed aircraft sustaining rotor, a blade mounting mechanism including a pivot the axis of which when projected on a plane perpendicular to the longitudinal blade axis and containing the axis of the hub of the rotor makes an acute angle with the hub axis, a pitch varying mounting for the blade located inboard of said pivot and including members relatively rotatable substantially about the longitudinal axis of the blade, a device for controlling the blade pitch angle associated with said members and adapted to react therebetween, said device being disconnectible by displacement of a portion thereof with respect to one of said members, the displaceable portion of said device being provided with stop means for restricting relative rotation of said members, and releasable means for retaining said displaceable portion in its normal operative position.

15. In an aircraft sustaining rotor having a hub and a plurality of blades, a blade mounting construction for one of said blades comprising a flight pivot the axis of which is normally oblique to a plane perpendicular to the hub axis and a pivot approximately coaxial with the longitudinal axis of said blade and operatively interposed between the hub and the first named pivot, mechanism for controllably shifting the blade about the latter pivot to effect blade pitch change for flight operations and mechanism normally limiting the blade movements about said pivot to a predetermined flight range, and means for rendering each of said mechanisms substantially ineffective for said purposes whereby the blade and the first named pivot may be moved about the second named pivot to a position outside of said range for subsequent folding of the blade about the axis of the first named pivot.

16. In an aircraft sustaining rotor having a generally upright hub and a plurality of generally radially extending blades, a flight pivot for one of said blades having its axis oblique to a plane perpendicular to the hub axis, and mechanism for shifting the axis of said pivot to a position approximating parallelism with the hub axis without disconnecting said blade from the hub, whereby said blade may be swung about the axis of said pivot through an angle lying approximately in said plane.

17. In an aircraft sustaining rotor having a generally upright hub and a plurality of generally radially extending blades, a flight pivot for one of said blades having its axis oblique to a plane perpendicular to the hub axis, a second flight pivot operatively interposed between the hub and the first named pivot and having its axis so disposed that when viewed in plan the included angle between the same and the leading edge of the blade is an acute angle, and mechanism for shifting the axis of the first pivot to a position approximating parallelism with the hub axis to provide for swinging of the blade about the axis of said first pivot approximately in the said plane perpendicular to the rotor axis into a position approximating parallelism with the axis of the second pivot to provide freedom for adjustment of the plane of the blade in such senses as to facilitate compactness of folding of the rotor.

AGNEW E. LARSEN.

CERTIFICATE OF CORRECTION.

Patent No. 2,220,109. November 5, 1940.

AGNEW E. LARSEN.

It is hereby certified that error appears in the printed specification of the above numbered patent requiring correction as follows: Page 3, first column, line 68, for the word "motor" read --rotor--; page 4, first column, line 55, claim 3, for "from" read --for--; and second column, line 36, claim 6, for "mean" read --means--; and that the said Letters Patent should be read with this correction therein that the same may conform to the record of the case in the Patent Office.

Signed and sealed this 10th day of December, A. D. 1940.

Henry Van Arsdale,
Acting Commissioner of Patents.

(Seal)

CERTIFICATE OF CORRECTION.

Patent No. 2,220,109. November 5, 1940.

AGNEW E. LARSEN.

It is hereby certified that error appears in the printed specification of the above numbered patent requiring correction as follows: Page 3, first column, line 68, for the word "motor" read --rotor--; page 4, first column, line 55, claim 3, for "from" read --for--; and second column, line 36, claim 6, for "mean" read --means--; and that the said Letters Patent should be read with this correction therein that the same may conform to the record of the case in the Patent Office.

Signed and sealed this 10th day of December, A. D. 1940.

Henry Van Arsdale,
Acting Commissioner of Patents.

(Seal)